US012777158B2

(12) United States Patent
Srinivasamurthy et al.

(10) Patent No.: US 12,777,158 B2
(45) Date of Patent: Oct. 27, 2026

(54) SELECTING A QUANTIZATION VALUE FOR ENCODING A PICTURE

(71) Applicant: Texas Instruments Incorporated, Dallas, TX (US)

(72) Inventors: Naveen Srinivasamurthy, Bangalore (IN); Soyeb Nagori, Bangalore (IN); Manoj Koul, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 214 days.

(21) Appl. No.: 18/826,991

(22) Filed: Sep. 6, 2024

(65) Prior Publication Data

US 2024/0430431 A1 Dec. 26, 2024

Related U.S. Application Data

(63) Continuation of application No. 17/093,671, filed on Nov. 10, 2020, now Pat. No. 12,088,811, which is a continuation of application No. 16/734,785, filed on Jan. 6, 2020, now Pat. No. 10,869,039, which is a continuation of application No. 16/154,465, filed on Oct. 8, 2018, now Pat. No. 10,582,200, which is a continuation of application No. 14/992,962, filed on (Continued)

(30) Foreign Application Priority Data

Oct. 5, 2011 (IN) ........................... 3451/CHE/2011

(51) Int. Cl.

| | |
|---|---|
| ***H04N 19/132*** | (2014.01) |
| ***H04N 19/126*** | (2014.01) |
| ***H04N 19/152*** | (2014.01) |
| ***H04N 19/157*** | (2014.01) |
| ***H04N 19/172*** | (2014.01) |
| *H04N 19/124* | (2014.01) |
| *H04N 19/149* | (2014.01) |

(52) U.S. Cl.

CPC ......... *H04N 19/132* (2014.11); *H04N 19/126* (2014.11); *H04N 19/152* (2014.11); *H04N 19/157* (2014.11); *H04N 19/172* (2014.11); *H04N 19/124* (2014.11); *H04N 19/149* (2014.11)

(58) Field of Classification Search

CPC ..................................................... H04N 19/132
USPC ..................................................... 375/240.02
See application file for complete search history.

(56) References Cited

U.S. PATENT DOCUMENTS

| | | | | |
|---|---|---|---|---|
| 10,255,594 | B2 | 4/2019 | Wang et al. | |
| 2002/0012395 | A1* | 1/2002 | Song | H04N 19/132 375/E7.218 |

(Continued)

*Primary Examiner* — Yulin Sun
(74) *Attorney, Agent, or Firm* — Carl G. Peterson; Frank D. Cimino

(57) ABSTRACT

Several methods and systems for encoding pictures associated with video data are disclosed. In an embodiment, a method includes determining by a processing module, whether a picture is to be encoded based on at least one of a skip assessment associated with the picture and an encoding status of a pre-selected number of pictures preceding the picture in an encoding sequence. The method further includes encoding by the processing module, a plurality of rows of video data associated with the picture upon determining that the picture is to be encoded, wherein the plurality of rows are encoded based on a pre-selected maximum encoded picture size.

20 Claims, 6 Drawing Sheets

Related U.S. Application Data

Jan. 11, 2016, now Pat. No. 10,123,017, which is a continuation of application No. 13/644,286, filed on Oct. 4, 2012, now Pat. No. 9,237,352.

(56) References Cited

U.S. PATENT DOCUMENTS

| | | | |
|---|---|---|---|
| 2005/0053158 | A1 | 3/2005 | Regunathan et al. |
| 2008/0232457 | A1* | 9/2008 | Fallon .................. H04N 19/176<br>375/240 |
| 2010/0166061 | A1 | 7/2010 | Kondo et al. |
| 2011/0255594 | A1 | 10/2011 | Nagori et al. |

* cited by examiner

SELECTING A QUANTIZATION VALUE FOR ENCODING A PICTURE

CROSS REFERENCE TO RELATED APPLICATIONS

This application is a continuation of U.S. application Ser. No. 17/093,671, filed Nov. 10, 2020, currently pending and scheduled to grant as U.S. Pat. No. 12,088,811 on Sep. 10, 2024, which is a continuation of U.S. application Ser. No. 16/734,785, filed Jan. 6, 2020 (now U.S. Pat. No. 10,869, 039), which is a continuation of U.S. application Ser. No. 16/154,465, filed Oct. 8, 2018 (now U.S. Pat. No. 10,582, 200), which is a continuation of U.S. application Ser. No. 14/992,962, filed Jan. 11, 2016 (now U.S. Pat. No. 10,123, 017), which is a continuation of U.S. application Ser. No. 13/644,286, filed Oct. 4, 2012 (now U.S. Pat. No. 9,237, 352), which claims priority to Indian Provisional Application No. 3451/CHE/2011, filed Oct. 5, 2011, which are hereby incorporated herein by reference in their entireties.

TECHNICAL FIELD

The present disclosure generally relates to the field of encoding of video data.

BACKGROUND

Applications with strict real-time requirements, such as video conferencing and gaming specify an acceptable latency (for example, 100 milliseconds to 300 milliseconds) for a video encoder. Pursuant to an exemplary scenario, a video rate control (RC) mechanism of the video encoder may utilize a hypothetical model of a decoder, such as video buffer verifier (VBV), specified by video compression standards, such as Moving Pictures Expert Group (MPEG)-4 and International Telecommunication Union Standardization Sector (ITU-T), to achieve an adherence to the latency specifications. The RC mechanism may be configured to skip encoding of pictures corresponding to the video data upon an occupancy of the VBV approaching fullness during encoding. The pictures may be skipped during encoding until the occupancy of the VBV reduces below a maximum allowable occupancy, so as to ensure adherence to the latency specification. Pursuant to an exemplary scenario, in order to reduce the number of pictures skipped during encoding, a limit is placed on a maximum size of encoded picture. However, such a limit may affect a picture quality when a picture prediction is not effective and a residual energy is large.

SUMMARY

This Summary is provided to comply with 37 C.F.R. § 1.73, requiring a summary of the invention briefly indicating the nature and substance of the invention. It is submitted with the understanding that it will not be used to interpret or limit the scope or meaning of the claims.

Various systems, methods, and computer-readable mediums for encoding pictures associated with a video data are disclosed. In an embodiment, a method includes determining by a processing module, whether a picture is to be encoded based on at least one of a skip assessment associated with the picture and an encoding status of a pre-selected number of pictures preceding the picture in an encoding sequence. The method further includes encoding by the processing module, a plurality of rows of video data associated with the picture upon determining that the picture is to be encoded. In one embodiment, the plurality of rows is encoded based on a pre-selected maximum encoded picture size. In an embodiment, a number of bits associated with the pre-selected maximum encoded picture size is configured to be a value from among a plurality of values ranging from 15 times an average number of bits associated with encoded pictures in the encoding sequence to 45 times the average number of bits.

In an embodiment, determining whether the picture is to be encoded comprises determining a number of encoded pictures in a set of pictures comprising the picture and the pre-selected number of pictures. The picture is determined to be encoded if the number of encoded pictures in the set of pictures is less than a pre-determined number. In an embodiment, the picture is determined to be skipped from encoding if the skip assessment associated with the picture is positive and if the number of encoded pictures in the set of pictures is greater than or equal to the pre-determined number. In an embodiment, a subsequent picture in the encoding sequence is selected for determination of whether to be encoded upon one of the encoding of the plurality of rows of video data associated with the picture and the determination of skipping of encoding of the picture.

In an embodiment, encoding the plurality of rows of video data comprises tracking a number of bits consumed during encoding each row of video data from among the plurality of rows of video data. A quantization scale is dynamically adjusted for encoding one or more remaining rows of video data from among the plurality of rows of video data if a number of bits associated with the maximum encoded picture size is likely to be exceeded during encoding of the one or more remaining rows of video data. The one or more remaining rows of video data are then encoded based on the adjusted quantization scale. In an embodiment, the quantization scale is adjusted based on a weighted average of products of bits and quantization scales associated with one or more rows of video data previously encoded from among the plurality of rows of video data.

Additionally, in an embodiment, a system for encoding pictures associated with video data is provided. In an embodiment, the system includes a processing module and a memory module. The processing module is configured to determine whether a picture is to be encoded based on at least one of a skip assessment associated with the picture and an encoding status of a pre-selected number of pictures preceding the picture in an encoding sequence. The processing module is further configured to encode a plurality of rows of video data associated with the picture upon determining that the picture is to be encoded, wherein the plurality of rows are encoded based on a pre-selected maximum encoded picture size. The memory module is communicatively associated with the processing module and comprises a hypothetical buffer configured to store one or more encoded pictures from among the pictures in the encoding sequence.

Moreover, in an embodiment, a non-transitory computer-readable medium is provided. The non-transitory computer-readable medium is configured to store a set of instructions that when executed cause a computer to perform a method for encoding pictures associated with video data. The method includes determining, whether a picture is to be encoded based on at least one of a skip assessment associated with the picture and an encoding status of a pre-selected number of pictures preceding the picture in an encoding sequence. The method further includes encoding a plurality of rows of video data associated with the picture upon determining that the picture is to be encoded. In one embodiment, the plurality of rows is encoded based on a pre-selected maximum encoded picture size. In an embodiment, a number of bits associated with the pre-selected maximum encoded picture size is configured to be a value from among a plurality of values ranging from 15 times an average number of bits associated with encoded pictures in the encoding sequence to 45 times the average number of bits.

Other aspects and example embodiments are provided in the drawings and the detailed description that follows.

DETAILED DESCRIPTION

Pursuant to an exemplary scenario, a video rate control (RC) mechanism of the video encoder may utilize a hypothetical model of a decoder, such as video buffer verifier (VBV), specified by video compression standards, such as Moving Pictures Expert Group (MPEG)-4 and/or International Telecommunication Union Standardization Sector (ITU-T), to achieve an adherence to the latency specifications. The RC mechanism may be configured to skip encoding of pictures corresponding to the video data upon an occupancy of the VBV approaching fullness during encoding. The pictures may be skipped during encoding until the occupancy reduces below a maximum allowable occupancy, so as ensure adherence to the latency specification. Pursuant to an exemplary scenario, in order to reduce the number of pictures skipped during encoding, a limit is placed on a maximum size of encoded picture. However, such a limit may affect a picture quality when a picture prediction is not effective and a residual energy is large. Various embodiments of the present technology, however, provide methods and systems for encoding of pictures associated with video data that are capable of overcoming these and other obstacles and providing additional benefits.

The following description and accompanying figures demonstrate that the present technology may be practiced, or otherwise implemented, in a variety of different embodiments. It should be noted, however, that the scope of the present technology is not limited to any or all of the embodiments disclosed herein. Indeed, one or more of the devices, features, operations, processes, characteristics, or other qualities of a disclosed embodiment may be removed, replaced, supplemented, or changed.

Figure 1:
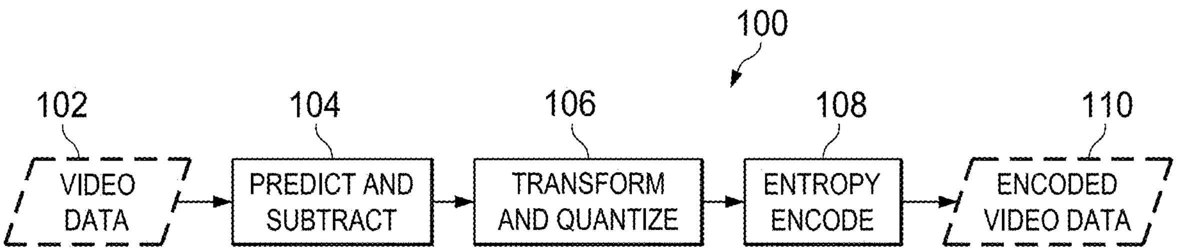
FIG. 1 illustrates a simplified overview of encoding of video data, in accordance with an exemplary scenario.

FIG. 1 illustrates a simplified overview of encoding of video data 102, in accordance with an exemplary scenario. In particular, FIG. 1 illustrates a simplified overview of an encoding process flow 100 for encoding video data 102. Pursuant to an exemplary scenario, a video encoder may perform the encoding process flow 100 to achieve the compression of the video data 102. The video data 102 may be compressed so as to efficiently utilize a storage capacity during storage or a spectrum/bandwidth during transmission.

The video encoder may be configured within a multimedia system. Examples of the multimedia system may include, but are not limited to, (1) multimedia devices, such as cellular phones, digital video cameras and digital camcorders; (2) data processing devices, such as personal computers, laptops and personal digital assistants; and (3) consumer electronics, such as set top boxes, digital video disk (DVD) players and video network servers. Pursuant to an exemplary scenario, the video encoder may be any machine capable of executing a set of instructions (sequential and/or otherwise) so as to perform an encoding of video data 102.

The video data 102 may be received by the video encoder from a media capture device. Examples of the media capture device may include a video camera or a camcorder. The media capture device may be, for example, a stand-alone device or a part of a mobile device, such as a Smartphone, or a data processing device, such as a personal computer, a laptop device or a personal digital assistant (PDA). The video data 102 may also be received by the video encoder from a transcoding system (implemented in any of hardware, software or firmware), which may be stand-alone device or a part of media capture device. Examples of video data 102 may include, for example, image data, graphical data, textual data or any combination thereof.

Pursuant to an exemplary scenario, the video data 102 may include a plurality of pictures, and each picture of the plurality of pictures may include rows of video data 102. Each row of video data 102 may include several blocks of data (for example, macroblocks, largest coding units, and the like). At 104 of the encoding process flow 100, a prediction for each block from among a number of blocks is determined and subtracted from each block to form a residual video data. The prediction for each block of video data 102 may be performed based on previously encoded blocks of video data 102, either from current picture (e.g., intra prediction) or from other pictures that have already been encoded and transmitted (e.g., inter prediction). Identifying a suitable prediction may be referred to as motion estimation and subtracting the predicted blocks from the current block may be referred to as motion compensation.

After prediction and subtraction, at 106, the residual video data is transformed and quantized. The transformation of the residual video data outputs a set of transform coefficients, each of which is a weighting value for a standard basis pattern. The weighted basis patterns, when combined, are capable of re-creating the residual video data. The set of transform coefficients are then quantized (such as where each coefficient is scaled corresponding to a scale-down factor which may be a mathematical reciprocal of the scale-up factor specified by a multimedia standard, effectively setting a number of transform coefficients to a small value (including zero value)) to achieve compression.

The quantized transform coefficients, along with certain information (for example, information such as: information about the structure of compressed data, information about a complete sequence of video data 102 and/or information that enables a decoder to re-create the prediction), are subject to entropy encoding (e.g., conversion into binary codes using variable length coding and/or arithmetic coding) at 108. The entropy encoding of the quantized transform coefficients produces an efficient, compact binary representation of the information in the form of encoded video data 110. The encoded video data 110 may then be stored and/or transmitted.

Pursuant to an exemplary scenario, several applications involving encoding of video data, such as video data 102, may be associated with a latency specification. Pursuant to an exemplary scenario, latency may be an expression of delay measured in units of time, and, may be equivalent to an amount of time involved from encoding of a video data in a video encoder to its subsequent decoding at the decoder. Several latency-sensitive video applications involve an extremely small value of latency, for example of the order of a few milliseconds (ms). Video applications, such as television broadcast, video-on-demand, video playback, and the like may not involve real-time interaction and the latency between the source of video data and the decoded video data may be extended to several seconds. In video applications involving real-time interaction and a closed feed-back loop, such as video conference, video phone, gaming, and the like, the latency determines an extent of stability of the video applications and may be maintained at low values such as, for example, of the order of 33 ms.

Pursuant to an exemplary scenario, a video rate control (RC) mechanism of the video encoder may utilize a hypothetical model of a decoder to achieve an adherence to the latency specification. The hypothetical model of a decoder may be considered to be conceptually connected to the output of an encoding system and may be configured to receive a stream corresponding to the encoded video data, such as the encoded video data 110. Such a hypothetical model of a decoder is known as the hypothetical reference decoder (HRD) in H.263, H.264, and High Efficiency Video Coding (HEVC) and the video buffering verifier (VBV) in MPEG, and ITU-T. The hypothetical model of a decoder and buffering verifier are hereinafter collectively referred to as hypothetical buffer. The hypothetical buffer specifies rules that bit streams generated by an encoder must adhere to, for such an encoder to be considered conformant under a given standard or recommendation. A bit stream may be considered to be in compliance with the rules if the bit stream can be decoded by the hypothetical buffer without suffering from buffer overflow or buffer underflow. The hypothetical buffer parameters may be used to impose constraints on the encoded sizes of pictures and to assist in deciding the required buffer sizes and start-up delay.

The RC mechanism may be configured to skip encoding of pictures corresponding to the video data 102 upon an occupancy of the hypothetical buffer approaching fullness during encoding. The pictures may be skipped during encoding until the occupancy reduces below a maximum allowable occupancy, so as ensure adherence to the latency specification. In the case of pictures that consume a large number of bits on being encoded, such as intra coded pictures (I-pictures), an occupancy of the hypothetical buffer increases significantly and several subsequent pictures associated with the video data 102 may be skipped. In order to reduce the number of pictures skipped during encoding, a limit may be imposed on a maximum encoded picture size, such that the maximum encoded picture size is large enough to accommodate scenarios involving large number of bits, such as for the I-pictures and such that the maximum encoded picture size is also maintained within the limit in order to ensure that a number of consecutive pictures skipped during the video encoding is reduced.

In an exemplary scenario, owing to the limit on the maximum encoded picture size, sufficient bits may not be available for encoding of I-pictures leading to a large value of quantization scale being used for I-pictures. Pursuant to an exemplary scenario, the utilization of the large value of quantization scale may lead to video quality degradation. A periodic occurrence of I-pictures in a video data 102 may increase an extent of the video quality degradation and also results in occurrence of one or more pulsing artifacts in the encoded video data 110. The occurrence of the pulsing artifacts in the encoded video data 110 may be termed as "video pulsing". Video pulsing may refer to a visible periodic temporal discontinuity most noticeable in slow moving pictures.

As explained earlier, in order to meet the latency specifications, the video encoder may need to skip encoding of several consecutive pictures in the video data 102. Consequently, several consecutive pictures may not be encoded in between two successive encoded pictures. Such an encoded video data on being displayed (after decoding), may show jerkiness with several portions of the video data 102 associated with motion appearing to move in jerks instead of a smooth motion. Occurrence of jerkiness in the video data 102 may be termed as "video jerkiness", which may refer to severe perceptual distortion in the video data 102.

Additionally, in an exemplary scenario, the RC mechanism may include a row (or sub-picture) rate control (hereinafter referred to as row RC) that may be used to ensure that an encoded picture consumes less than the maximum encoded picture size. Pursuant to an exemplary scenario, upon the row RC detecting that a picture is consuming more than the maximum encoded picture size, the row RC may increase a quantization scale corresponding to a row of video data 102 associated with the picture to ensure that a subsequent row of the picture consumes less bits. In some exemplary scenarios, a complexity of the video data 102 may vary within the picture. For example, a top half of the picture may be associated with a lower complexity while a bottom half of the picture may be associated with a higher complexity. During encoding, the top half of the picture may not consume too many bits and the row RC may not increase the quantization scale. However, when the video encoder begins encoding the bottom half of the picture, a number of bits utilized may become significant and upon exceeding the maximum encoded picture size the row RC may increase the quantization scale. If the complexity of the bottom half of the picture is very high, then the quantization may be increased several times causing a video quality of the bottom half of the picture to be lower than the top half of the picture. The difference in the video quality between the top half and the bottom half of the picture may result in significant video quality variation within the picture that may be cause an overall video quality degradation from an end user perspective.

It is noted that the video pulsing, the video jerkiness, and the video quality degradation issues while being interlinked impose contradictory requirements on the video encoder. In order to minimize video pulsing and video quality degradation within the picture, it is desirable to have a large maximum encoded picture size. However, having a large maximum encoded picture size causes an increase in a number of pictures skipped during encoding causing video jerkiness. Various embodiments of the present technology, however, provide methods and systems involving an integrated approach to mitigate the video pulsing, the video jerkiness, and the video quality degradation issues so as to improve a perceptual video quality. The present technology enables overcoming the above mentioned and other obstacles while providing additional benefits. An exemplary system for encoding pictures associated with video data, such as video data 102, in accordance with the present technology is described herein with reference to FIG. 2.

Figure 2:
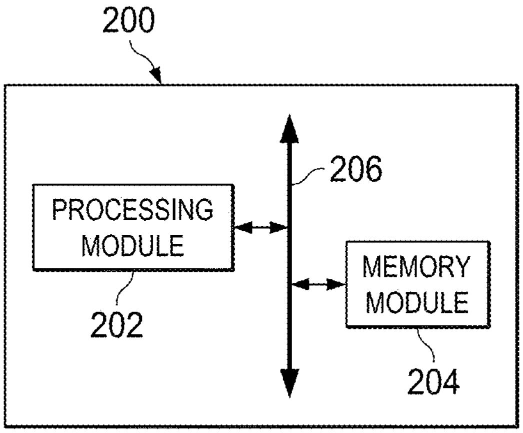
FIG. 2 is a block diagram of an exemplary system for encoding of pictures associated with video data, in accordance with an embodiment.

FIG. 2 is a block diagram of an exemplary system 200 for encoding pictures associated with video data, such as video data 102, in accordance with an embodiment. The pictures may include, for example, frames, fields, and the like. Furthermore, the pictures may be associated with various video content types, such as, for example, progressive video content, interlaced video content, and the like. In an embodiment, the system 200 is configured to be included within a video encoder. Examples of the video encoder may include a H.264 based encoder, HEVC based encoder, a MPEG-4 based encoder, and the like. In an exemplary embodiment, the system 200 may be configured within a personal computer (PC), a tablet PC, a personal digital assistant (PDA), a mobile communication device, a web appliance, a set-top box (STB), an embedded system and/or any machine capable of executing a set of instructions (sequential and/or otherwise) so as to perform encoding of pictures.

In an embodiment, the system 200 includes a processing module 202 and a memory module 204. In an embodiment, the memory module 204 is communicatively associated with the processing module 202. In an embodiment, the processing module 202 and the memory module 204 are configured to communicate with each other via or through a bus 206. Examples of the bus 206 may include, but are not limited to, a data bus, an address bus, a control bus, and the like. The bus 206 may be, for example, a serial bus, a bi-directional bus or a unidirectional bus.

In an embodiment, the processing module 202 may be embodied as a multi-core processor, a single core processor, or a combination of one or more multi-core processors and one or more single core processors. For example, the processing module 202 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processing module 202 may be configured to execute hard-coded functionality. In an embodiment, the processing module 202 is embodied as an executor of software instructions, wherein the instructions may specifically configure the processing module 202 to perform the algorithms and/or operations described herein when the instructions are executed. The processing module 202 may include, among other things, a clock, an arithmetic logic unit (ALU) and logic gates configured to support an operation of the processing module 202. Examples of the memory module 204 may include, but are not limited to, a random access memory (RAM), a dual port RAM, a synchronous dynamic RAM (SDRAM), a double data rate SDRAM (DDR SDRAM), and the like. In an embodiment, the memory module 204 is configured to comprise an encoder buffer and a hypothetical buffer, such as the hypothetical buffer explained with reference to FIG. 1, to store one or more encoded pictures from among the pictures in the encoding sequence.

In an embodiment, the processing module 202 is configured to determine whether a picture is to be encoded based on at least one of a skip assessment associated with the picture and an encoding status of a pre-selected number of pictures preceding the picture in an encoding sequence. In one embodiment, each picture in the encoding sequence corresponding to the video data may undergo determination of whether the each picture is to be encoded or skipped from encoding. In an embodiment, a RC mechanism may be configured to perform a skip assessment of each picture in the encoding sequence. In an embodiment, the RC mechanism may be embodied within the processing module 202 or may be configured to be external and communicatively associated with the processing module 202.

In one embodiment, the skip assessment is determined based on a pre-defined skip threshold and an occupancy of a hypothetical buffer, such as the hypothetical buffer explained in FIG. 1. In one embodiment, the skip assessment may be depicted in mathematical terms in equation (1) as:

$$\text{Picture Skip Assessment} + f(\text{Buffer\_fullness, Skip threshold}) \quad (1)$$

Where picture skip assessment corresponds to a skip assessment outcome for a picture, the buffer_fullness corresponds to an occupancy level (measured in terms of number of bits) of the hypothetical buffer and skip threshold corresponds to a pre-defined limit on the occupancy level of the hypothetical buffer. The equation (1) implies that a skip assessment for each picture is a function of the occupancy level of the hypothetical buffer at a time instant of encoding of the picture and the pre-defined skip threshold. In an embodiment, the pre-defined skip threshold corresponds to maximum allowable occupancy of the hypothetical buffer. In an embodiment, if the buffer_fullness is likely to be greater than or equal to the pre-defined skip threshold, then the skip assessment of the picture may be positive, implying that the picture may be skipped from encoding. In an embodiment, if the buffer_fullness is not likely to be greater than or equal to the pre-defined skip threshold, then the skip assessment of the picture may be negative, implying that the picture need not be skipped from encoding (that is the picture is assessed to be encoded). For example, if the pre-defined skip threshold is 10000 bits implying that a maximum allowable occupancy of the hypothetical buffer without suffering from the buffer underflow or buffer overflow is 10000 bits, and, if the occupancy of the hypothetical buffer is 9000 bits at a time of encoding of the picture and it is likely that the occupancy of the hypothetical buffer is likely to be exceeded during encoding of the picture, then a skip assessment of the picture may be positive, implying a skipping of encoding of the picture. In an embodiment, such a skip assessment may be performed for each picture in the encoding sequence.

In one embodiment, the processing module 202, in addition to performing the skip assessment, may determine the encoding status of a pre-selected number of pictures preceding the picture in an encoding sequence. In one embodiment, the encoding status may be indicative of whether the picture was encoded or skipped from encoding. In an embodiment, the processing module 202 is configured to define a set of pictures comprising the picture and a pre-selected number of pictures. For example, if the pre-selected number of pictures is four, then the set of pictures may be configured to comprise a current picture (for example, a picture for which the encoding is being determined to be performed or not) and four pictures preceding the current picture in the encoding sequence. In an embodiment, the pre-selected number of pictures may immediately precede the picture for encoding in the encoding sequence. The processing module 202 may be configured to determine a number of encoded pictures in the set of pictures comprising the current picture and the pre-selected number of pictures. In an embodiment, the current picture's encoding status may be accounted for determining the number of encoded pictures in the set of pictures.

In an embodiment, the current picture is determined to be encoded if the number of encoded pictures in the set of pictures is less than a pre-determined number. In an embodiment, the pre-determined number may be considered to correspond to a limit on a minimum number of encoded pictures required within each span of pictures in the encoding sequence to prevent the occurrence of video jerkiness, explained with reference to FIG. 1. For example, if the set of pictures include five pictures and the pre-determined number is three, then it is implied that at least three pictures are required to be encoded for every five pictures in the encoding sequence to prevent the occurrence of video jerkiness. In an example embodiment, if the number of encoded pictures from among the pre-selected number of pictures in the set of pictures is two and the pre-determined number is three, then the current picture is determined to be encoded to render a number of encoded pictures in the set of pictures to be at least equal to the minimum allowable number of encoded pictures in the set of pictures as suggested by the pre-determined number. However, if the number of encoded pictures from among the pre-selected number of pictures is three and the pre-determined number is three, then the current picture can be skipped if a skip assessment associated with the current picture is positive. In an embodiment, the processing module 202 may be configured to override a skip assessment of the picture if the number of encoded pictures in the set of pictures is less than the pre-determined number. For example, if the skip assessment associated with the current picture is positive implying the current picture may be skipped from encoding, and, if the number of encoded pictures in the set of pictures is less than the pre-determined number, then the processing module 202 may override the skip assessment and may determine the current picture to be encoded.

In an embodiment, the processing module 202 is configured to determine the current picture to be skipped from encoding if the skip assessment associated with the picture is positive and if the number of encoded pictures in the set of pictures is greater than or equal to the pre-determined number. For example, if in the set of five pictures, the number of encoded pictures is four and the pre-determined number is three, then the current picture may be skipped from encoding if the skip assessment associated with the current picture implies skipping from encoding. However, if the number of encoded pictures in the set of pictures is greater than or equal to the pre-determined number and the skip assessment of the current picture is negative, then the current picture may not be skipped, i.e. the current picture may be determined to be encoded. The determination of whether a picture from among the plurality of pictures associated with video data is to be encoded or skipped is further explained with reference to FIG. 3. In an embodiment, a subsequent picture in the encoding sequence is selected for determination of whether to be encoded upon one of the encoding of the plurality of rows of video data associated with the picture and the determination of skipping of encoding of the picture.

In an embodiment, the processing module 202 is configured to encode a plurality of rows of video data associated with the picture upon determining that the picture is to be encoded. For example, if video data corresponding to each picture is conceptually considered to define a substantially rectangular region, then the substantially rectangular region may be divided into horizontal rows, with each row including several blocks (for example, macroblocks) of video data. In an embodiment, the encoding of the picture may be performed in a raster scan order beginning from the top row and moving from leftmost block to the rightmost block and so on and so forth till the rightmost block of the bottom row. Accordingly, upon determining that the picture is to be encoded, the processing module 202 may be configured to encode the plurality of rows of video data associated with the picture.

In an embodiment, the plurality of rows may be encoded based on a pre-selected maximum encoded picture size. As explained with reference with FIG. 1, a limit may be placed on the maximum size of encoded pictures to preclude skipping of pictures on account of fullness of hypothetical buffer. In an embodiment, a number of bits associated with the pre-selected maximum encoded picture size is configured to be a value from among a plurality of values ranging from 15 times an average number of bits associated with encoded pictures in the encoding sequence to 45 times the average number of bits. For example, if the video data is captured at the rate of 'F' pictures per second and 'R' bits per second (bps), an average number of bits 'T' for each encoded video picture may be equal to R/F. In an embodiment, the processing module 204 is configured to select a value of the maximum encoded picture size from among the plurality of values ranging from 15*T to 45*T. In an embodiment, a choice of such a value may be used to mitigate the occurrence of video pulsing explained with reference to FIG. 1.

In an embodiment, encoding the plurality of rows of video data comprises tracking a number of bits consumed during encoding each row of video data from among the plurality of rows of video data. As described with reference to FIG. 1 during encoding the video data, a row RC mechanism ensures that an encoded picture consumes less than the maximum encoded picture size. However, if the rows of video data are consuming more number of bits during encoding (for example, on account of complexity) and if a number of bits associated with the maximum encoded picture size is likely to be exceeded during encoding of the one or more remaining rows of video data, then the processing module 202 is configured to dynamically adjust a quantization scale for encoding one or more remaining rows of video data from among the plurality of rows of video data. In an embodiment, the processing module 202 is configured to encode the one or more remaining rows of video data based on the adjusted quantization scale.

In an embodiment, during encoding of a row of video data corresponding to the picture, if it is determined that the number of bits associated with the maximum encoded picture size is likely to be exceeded during encoding of the one or more remaining rows of video data, the processing module 202 increases a quantization scale (Qs) associated with either the corresponding row of the picture or Qs of the sub-picture as a whole to ensure that the subsequent portion (e.g., a subsequent row) of the picture consumes less bits. In an embodiment, the quantization scale is adjusted based on a weighted average of products of number of bits and quantization scales associated with one or more rows of video data previously encoded from among the plurality of rows of video data. In an embodiment, the weighted average may be implemented in such a manner that the rows immediately preceding the row of video data currently being encoded may be assigned higher weightage. The higher weightage is assigned to the immediately preceding rows to provide a better indication of the complexity of the row of video data currently being encoded than that of the encoded rows of video data farther away from the row of video data currently being encoded. In an embodiment, the weighted average is computed based on a triangular weighing function. In an embodiment, dynamically adjusting the quantization scale based on the weighted average value may mitigate occurrence of video quality degradation explained with reference to FIG. 1. The computation of the weighted average based on the triangular weighing function and the adjusting of the quantization scale is explained further with reference to FIG. 4.

In an embodiment, the system 200 additionally includes components, such as an input unit (e.g., an image processing device), a video display unit (e.g., liquid crystals display (LCD), a cathode ray tube (CRT), and the like), a cursor control device (e.g., a mouse), a drive unit (e.g., a disk drive), a signal generation unit (e.g., a speaker) and/or a network interface unit. The input unit is configured to transfer the video data to the processing module 202 for processing of the video data. The drive unit includes a machine-readable medium upon which is stored one or more sets of instructions (e.g., software) embodying one or more of the methodologies and/or functions described herein. In an embodiment, the software resides, either completely or partially, within the memory module 204 and/or within the processing module 202 during the execution thereof by the system 200, such that the memory module 204 and processing module 202 also constitute a machine-readable media. The software may further be transmitted and/or received over a network via the network interface unit.

The term "machine-readable medium" may be construed to include a single medium and/or multiple media (e.g., a centralized and/or distributed database, and/or associated caches and servers) that store the one or more sets of instructions. Moreover, the term "machine-readable medium" may be construed to include any medium that is capable of storing, encoding and/or carrying a set of instructions for execution by the system 200 and that cause the system 200 to perform any one or more of the methodologies of the various embodiments. Furthermore, the term "machine-readable medium" may be construed to include, but shall not be limited to, solid-state memories, optical and magnetic media, and carrier wave signals.

Figure 3:
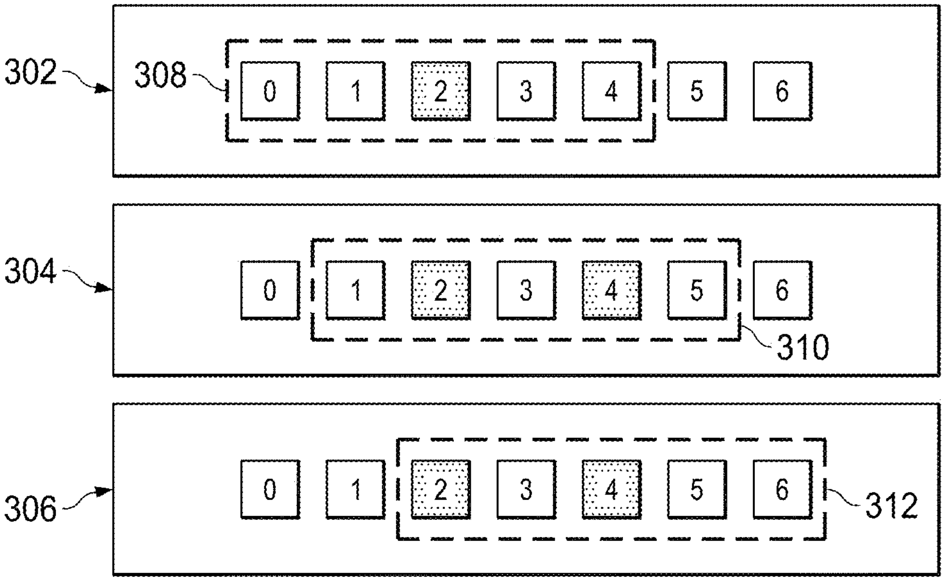
FIG. 3 depicts exemplary scenarios for determining whether a picture is to be encoded, in accordance with an embodiment.

FIG. 3 depicts exemplary scenarios for determining whether a picture is to be encoded, in accordance with an embodiment. Each picture from among a plurality of pictures in an encoding sequence associated with video data, such as the video data 102 of FIG. 1, may undergo such a determination in an on-going manner. FIG. 3 depicts three instances, corresponding to three pictures in the encoding sequence, where it is determined whether the corresponding picture is to be encoded or skipped from encoding. Each of the three instances depict a portion of the encoding sequence including seven pictures, referred to by numerals 0, 1, 2, 3, 4, 5 and 6 in boxes in FIG. 3, and referred to herein as picture 0, picture 1, picture 2 and so on and so forth, respectively. It is noted that that the seven pictures are depicted for illustration purposes and that similar determination for encoding may be performed for each picture in the encoding sequence and may not be limited to the pictures depicted in FIG. 3.

In FIG. 3, at instance 302, it is determined whether picture 4 is to be encoded or skipped from encoding. Similarly, at instances 304 and 306, it is determined whether pictures 5 and 6 are to be encoded or not. The darkened/highlighted boxes in FIG. 3 represent pictures being skipped or not 'selected for encoding' during previous instances. For example, picture 2 is determined to be skipped from encoding during an earlier instance of determination performed corresponding to the picture 2. As explained with reference to FIG. 2, the processing module 202 is configured to determine whether a picture is to be encoded based on at least one of a skip assessment associated with the picture and an encoding status of a pre-selected number of pictures preceding the picture in an encoding sequence. The skip assessment for each picture in the encoding sequence may be performed as explained with reference to FIG. 2.

At instance 302, a set of pictures is defined (for example, by the processing module 202 of FIG. 2) comprising the current picture for which determination of encoding is to be performed (for example, picture 4) and a pre-selected number of pictures preceding the current picture in the encoding sequence. In an exemplary embodiment, the pre-selected number of pictures is chosen to be four. Accordingly, for the current picture 4, the pre-selected number of pictures preceding picture 4 in the encoding sequence correspond to pictures 0, 1, 2 and 3. Accordingly, the set of pictures comprises pictures, 0, 1, 2, 3 and 4 and is depicted to be outlined by box 308. As explained with reference to FIG. 2, a number of encoded pictures (including accounting for the determination of the current picture's encoding status) is compared with a pre-determined number. In an exemplary embodiment, the pre-determined number is chosen to be three. In the instance 302, only one picture (picture 2) is depicted to have an encoding status of 'skipped from encoding'. Accordingly, a number of encoded pictures from among the pre-selected number of pictures is three. Since the number of pictures in the set of pictures would be three (equal to the predetermined number) irrespective of the encoding decision on picture 4, the picture 4 may be skipped if the skip assessment associated with the picture 4 is positive, implying the picture 4 may be skipped.

For the next picture (for example, picture 5) in the encoding sequence, a similar determination on encoding may be performed depicted by the instance 304. A set of pictures may be defined including the current picture 5 and pre-selected number of pictures preceding the picture 5 in encoding sequence. In an exemplary embodiment, the pre-selected number is chosen to be four. Accordingly, pictures 1, 2, 3, 4 and 5 may configure the set of pictures (depicted to be outlined by box 310). A number of encoded pictures from among the pre-selected number of pictures is two, since pictures 2 and 4 were determined to be skipped from encoding. Accordingly, if the pre-determined number is chosen to be three, then the number of encoded pictures in the set of pictures will be less than the pre-determined number unless picture 5 is determined to be encoded. Accordingly, picture 5 may be determined to be encoded, irrespective of the skip assessment associated with the picture 5.

For the next picture (for example, picture 6) in the encoding sequence, a similar determination on encoding may be performed, as depicted by the instance 306. Pictures 2, 3, 4, 5 and 6 may configure the set of pictures (depicted to be outlined by box 312) corresponding to the pre-selected number of pictures chosen to be 4. A number of encoded pictures from among the pre-selected number of pictures is two, since pictures 2 and 4 were determined to be skipped from encoding. Accordingly, if the pre-determined number is chosen to be two, then the number of encoded pictures in the set of pictures will be equal to the pre-determined number. If the skip assessment associated with picture 6 is negative, the picture 6 may not be skipped from encoding irrespective of the encoding decision on picture 6. Accordingly, in spite of the number of pictures in the set 312 being equal to the pre-determined number, the picture 6 is determined to be encoded.

In an embodiment, the pre-selected number of pictures for configuring the set of pictures and the pre-determined number corresponding to a minimum required number of encoded pictures within each set may be pre-defined or may be dynamically modified depending upon situational requirements by the processing module 202. In an embodiment, configuring the set of pictures, such as those depicted by boxes 308, 310 and 312 may be enabled, using a sliding window concept, wherein a conceptual window may be slided over the pictures aligned in the encoding sequence, one picture at a time, to configure the set of pictures for each picture being encoded. In an embodiment, by performing determination of whether the picture is to be encoded or not in such a manner, an occurrence of number of consecutive pictures being skipped may be precluded thereby mitigating the occurrence of video jerkiness issue as outlined with reference to FIG. 1.

Figure 4:
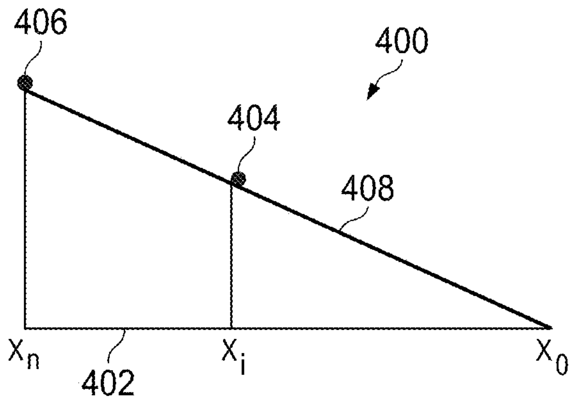
FIG. 4 illustrates an exemplary computation of a weighted average based on a triangular function for adjusting a quantization scale for encoding one or more remaining rows of video data, in accordance with an embodiment.

FIG. 4 illustrates an exemplary computation of a weighted average based on a triangular function for adjusting a quantization scale for encoding one or more remaining rows of video data, in accordance with an embodiment. As explained with reference to FIG. 2, in an embodiment, the video data corresponding to a picture is encoded in a raster scan order, from top row to the bottom row and from leftmost macroblock to the rightmost macroblock in each row. Further, a bit consumption is constantly tracked during encoding rows of data and checked for a likelihood of exceeding a number of bits corresponding to a pre-selected maximum encoded picture size. In an embodiment, during encoding of a row of video data corresponding to the picture, if it is determined that the number of bits associated with the pre-selected maximum encoded picture size is likely to be exceeded during encoding of the one or more remaining rows of video data, the processing module 202 increases a quantization scale (Qs) associated with either the corresponding row of the picture or Qs of the sub-picture as a whole to ensure that the subsequent portion (e.g., a subsequent row) of the picture consumes less bits. The quantization scale may be adjusted to a new value computed based on a weighted average of products of number of bits and quantization scales associated with one or more rows of video data previously encoded from among the plurality of rows of video data. In an embodiment, the weighted average may be implemented in such a manner that the rows immediately preceding a row of video data currently being encoded may be assigned higher weightage. The higher weightage may be assigned as the immediately preceding rows may provide a better indication of the complexity of the row of video data currently being encoded than that of the encoded rows of video data farther away from the row of video data currently being encoded. In an embodiment, the weighted average is computed based on the triangular weighing function.

The triangular weighing function may be configured to form a recursive equation, such that a complexity required to derive the weighted average value is low from one row of video data to a subsequent row of video data. Further, the triangular weighted function may be configured in a manner that enables utilization of sufficient amount of data associated with a picture or a row of video data associated with the picture while computing the weighted average. FIG. 4 depicts a triangle 400 representative of the triangular weighing function. The points $x_0$, $x_i$, and $x_n$ marked on a base edge 402 of the triangle 400 represent a product of a number of bits and a Qs value corresponding to $0^{th}$ row, $i^{th}$ row, and $n^{th}$ row respectively of the picture. The points 404 and 406 marked on the hypotenuse 408 of the triangle 400 represent a value of a variable $i/n*x_i$ of the triangular function corresponding to the points $x_i$, and $x_n$ respectively on the base edge 402, i being a positive integer with a value ranging from 0 to n corresponding to n+1 rows of video data associated with the picture. In an embodiment, weighted average value $W_n$ may be computed as provided in equation (2):

$$W_n = \frac{1}{K}\sum_{i=1:n}\frac{i}{n}x_i \tag{2}$$

Wherein $x_i$ is the product of the number of bits and the value of Qs corresponding to $i_{th}$ row, n is a positive integer representing a number of rows associated with the picture and K is a factor configured to ensure that an area of the triangle 400 is 1 to ensure that the weighted average value remains equal to 1 upon all $x_i$ being 1. On substituting $W_n=1$, $x_i=1$ in equation (2), the equation (3) may be deduced as:

$$1 = \frac{1}{K}\sum_{i=1:n}\frac{i}{n} = \frac{1}{K}*\frac{1}{n}*\frac{(n*(n+1))}{2} = \frac{1}{K}*\frac{(n+1)}{2} \tag{3}$$

Based on equation (3) it may be deduced that K is equal to (n+1)/2. Further, by substituting the value of K in equation (2), following equation (4) may be deduced:

$$W_n = \frac{2}{n+1}\sum_{i=1:n}\frac{i}{n}x_i \tag{4}$$

In an embodiment, to derive a recursive equation, $W_n$ may be expressed in terms of $x_n$ and $W_{n-1}$ to obtain the following equation (5):

$$W_n = \frac{2}{n+1}\left[x_n + \sum_{i=1:n-1}\frac{i}{n}x_i\right] \tag{5}$$

The equation (5) may be further refined to obtain the weighted average factor as provided in the following equation (6):

$$W_n = \frac{2x_n}{n+1} + \frac{(n-1)}{(n+1)}W_{n-1} \tag{6}$$

Wherein, the initialization $W_0$ is assigned a zero value.

The weighted average factor $W_n$ as obtained in equation (6) may be utilized for adjusting the value of the quantization scale for encoding the one or more remaining rows of video data. The utilization of the weighted average factor for computing the adjusted quantization scale is explained below.

Pursuant to an exemplary scenario, an average number of encoded bits "b" per macro block (MB) may be related to the quantization scale "Qs" as per equation (7) as follows:

$$b = k / Qs \tag{7}$$

where, k is proportionality constant.

Upon expressing the average number of encoded bits "b" in terms of a number of macroblocks encoded ($MB_{enc}$) at any given instant and a number of bits utilized for the encoding the corresponding number of macroblocks in equation (7), the following equation (8) may be deduced:

$$B_{enc} / MB_{enc} = k / Qs_{avg} \tag{8}$$

Wherein $Q_{Savg}$ is an average quantization scale for the encoded MBs.

Using equation (8), an expected bit consumption ($B_{expected}$) for encoding the remaining MBs corresponding to the one or rows of video data associated with the picture, using the average quantization scale $Q_{Savg}$, is deduced in the following equation (9):

$$B_{expected} = k / Qs_{avg} * (MB_{tot} - MB_{enc}) \tag{9}$$

Wherein, $MB_{tot}$ is a total number of MBs in the picture (for example, a total number of all the macroblocks in the plurality of rows of video data associated with the picture). In an embodiment, by combining equations (8) and (9), the following equation (10) may be deduced:

$$B_{expected} = B_{enc} / MB_{enc} * (MB_{tot} - MB_{enc}) \tag{10}$$

The value of Qs for a subsequent row of MBs is increased upon determining a value of $B_{expected}$ to be greater than ($B_{max}$–$B_{enc}$), where $B_{max}$ is a maximum encoded picture size (in terms of bits). Further, by combining equation (10) and the equation $B_{expected}$>($B_{max}$–$B_{enc}$) and re-arranging the terms, a condition for increasing the value of Qs for the subsequent row of MBs may be deduced as provided in equation (11):

$$B_{enc} * (MB_{tot} - MB_{enc}) > (B_{max} - B_{enc}) * MB_{enc} \tag{11}$$

Upon the condition (11) being satisfied, it may be deduced that the maximum encoded picture size is likely to be exceeded and so the value of Qs is increased for the remaining portion of the picture to ensure that an expected bit consumption for the remaining MBs "$B_{expected\_new}$" is less than $B_{max}$–$B_{enc}$, where the value of $B_{expected\_new}$ is computed based on equation (10) as:

$$B_{expected\_new} = k / Qs_{new} * (MB_{tot} - MB_{enc}) \tag{12}$$

Therefore, to ensure that the bit consumption for the remaining MBs is not likely to exceed the maximum encoded picture size, $B_{expected\_new}$ may comply to equation (13):

$$B_{expected\_new} \leq B_{max} - B_{enc} \tag{13}$$

From equations (12) and (13), the following equation (14) may be deduced:

$$k / Qs_{new} * (MB_{tot} - MB_{enc}) \leq B_{max} - B_{enc} \tag{14}$$

After, re-arranging terms in equation (14), equation for $Q_{Snew}$ may be obtained in the equation (15) as:

$$Qs_{new} \geq k * \frac{(MB_{tot} - MB_{enc})}{(B_{max} - B_{enc})} \tag{15}$$

Substituting for k from equation (2), the following equation (16) may be deduced:

$$Qs_{new} \geq Qs_{avg} * \frac{B_{enc}}{MB_{enc}} * \frac{(MB_{tot} - MB_{enc})}{(B_{max} - B_{enc})} \tag{16}$$

The new value of quantization scale may accordingly be set to:

$$Qs_{new} = Qs_{avg} * \frac{B_{enc}}{MB_{enc}} * \frac{(MB_{tot} - MB_{enc})}{(B_{max} - B_{enc})} \tag{17}$$

In accordance with an embodiment, the product of $Q_{Savg}$ and $B_{enc}$ in equation (17) may be replaced with the weighted average $n*W_n$ corresponding to n rows of the picture, for assigning higher weightage to immediately preceding rows, as the immediately preceding rows may provide a better indication of the complexity of the row of video data currently being encoded than that of the encoded rows of video data farther away from the row of video data currently being encoded. Accordingly, the weighted average may be computed using the weighted average factor $W_n$ from equation (6) to obtain the weighted average as:

$$n * W_n = n * \frac{2}{n+1} \sum_{i=1:n} \frac{i}{n} (B_i * Qs_i) \tag{18}$$

By replacing the product $Q_{Savg}*B_{enc}$ in equation (17) with the weighted average in equation (18) the value of quantization scale is set to:

$$Qs_{new} = n * W_n * \frac{1}{MB_{enc}} * \frac{(MB_{tot} - MB_{enc})}{(B_{max} - B_{enc})} \quad (19)$$

In an embodiment, dynamically adjusting the quantization scale based on equation (19) may mitigate occurrence of video degradation explained with reference to FIG. 1. An exemplary scenario of reducing video pulsing based on the system 200 of the present technology is described in FIGS. 5A, 5B and 5C.

Figure 5A:
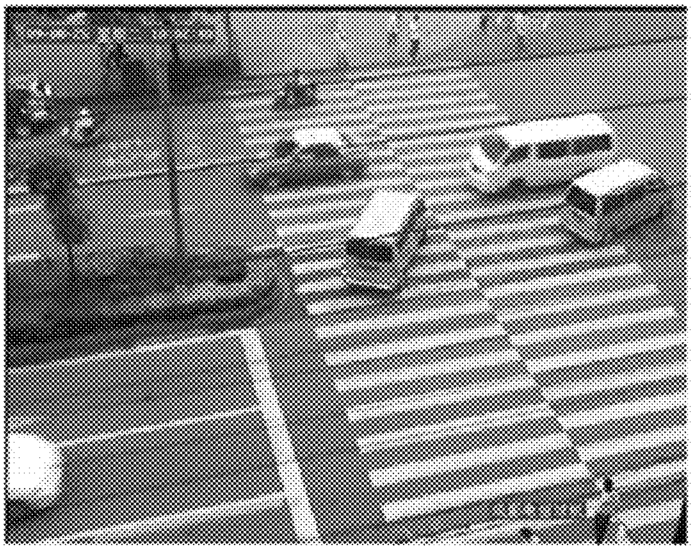
FIGS. 5A-5C depict an exemplary scenario illustrating a reduction in video pulsing on encoding a plurality of rows of video data based on a pre-selected maximum encoded picture size, in accordance with an embodiment.
Figure 5B:
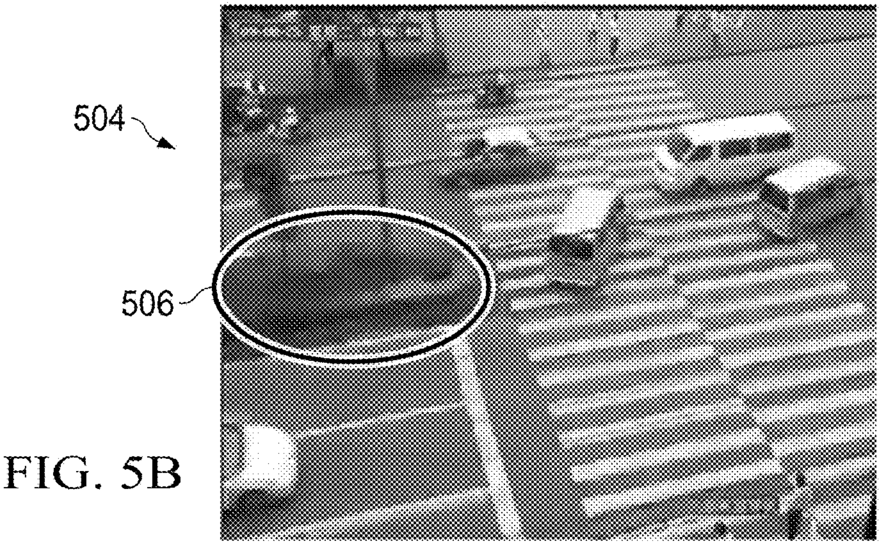
Figure 5C:
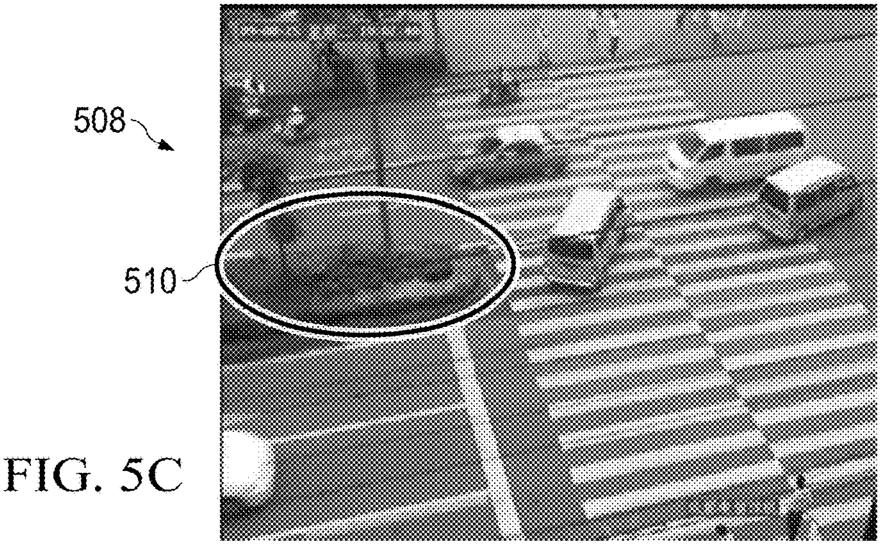

FIGS. 5A-5C depict an exemplary scenario illustrating a reduction in video pulsing on encoding a plurality of rows of video data based on pre-selected maximum encoded picture size, in accordance with an embodiment. More specifically, FIG. 5A depicts an exemplary picture 502 corresponding to video data and FIG. 5B depicts an exemplary picture 504 obtained on decoding the picture 502 subsequent to subjecting the picture 502 to encoding while limiting a maximum encoded picture size to a low value (for example, a value between 4*T to 6*T, where 'T' corresponds to an average number for bits utilized for encoded pictures corresponding to the video data). Occurrence of severe video quality degradation may be observed in a region 506 within the picture 504 of FIG. 5B when compared to the picture 502 of FIG. 5A.

FIG. 5C depicts a picture 508 obtained on decoding the picture 502 subsequent to encoding the picture 502 of FIG. 5A with the maximum encoded picture size associated with a value from among the plurality of values ranging from 15*T to 45*T. In an embodiment, choosing such a value for the maximum encoded picture size may mitigate of the occurrence of video pulsing. For example, it may be observed that in FIG. 5B, a grass patch depicted in the region 506 is significantly distorted, while a perceptible improvement in the grass area may be observed in the corresponding region 510 of the picture 508 of FIG. 5C, indicating a significant perceptual video quality improvement and reduction in video pulsing on account of choosing a value for the maximum encoded picture size to be one among the plurality of values ranging from 15*T to 45*T.

Figure 6A:
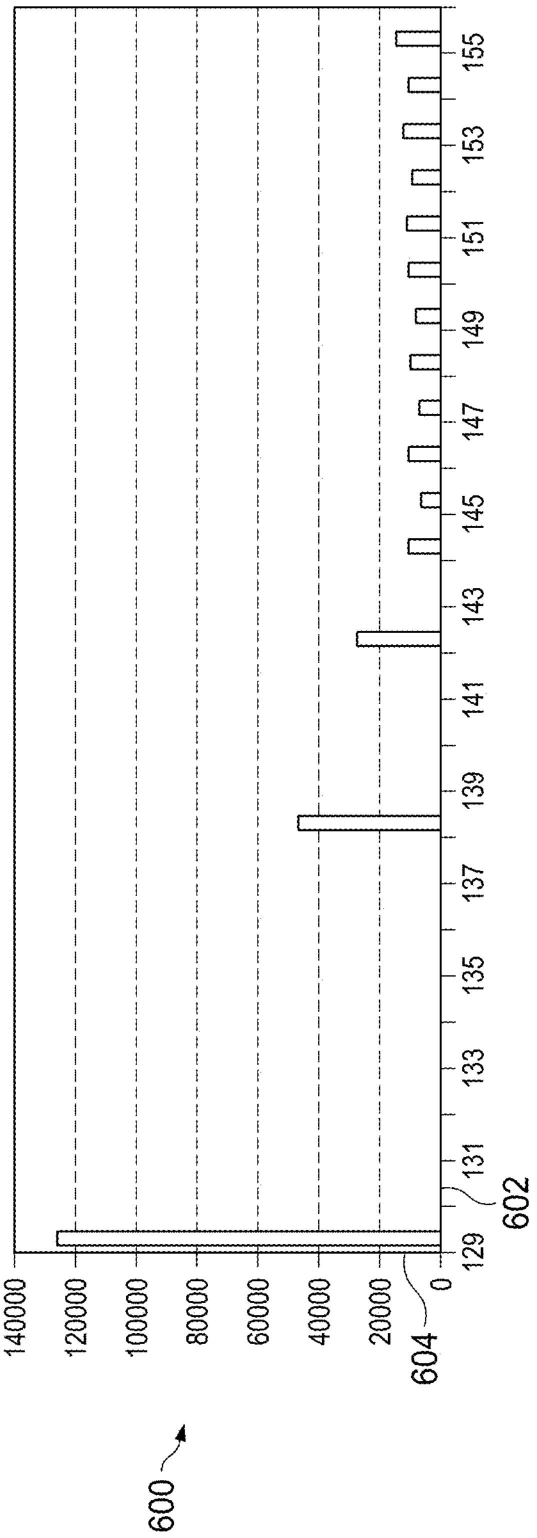
FIGS. 6A-6B depict an exemplary scenario illustrating a reduction in video jerkiness upon encoding of pictures corresponding to video data as explained with reference to system of FIG. 2, in accordance with an embodiment.
Figure 6B:
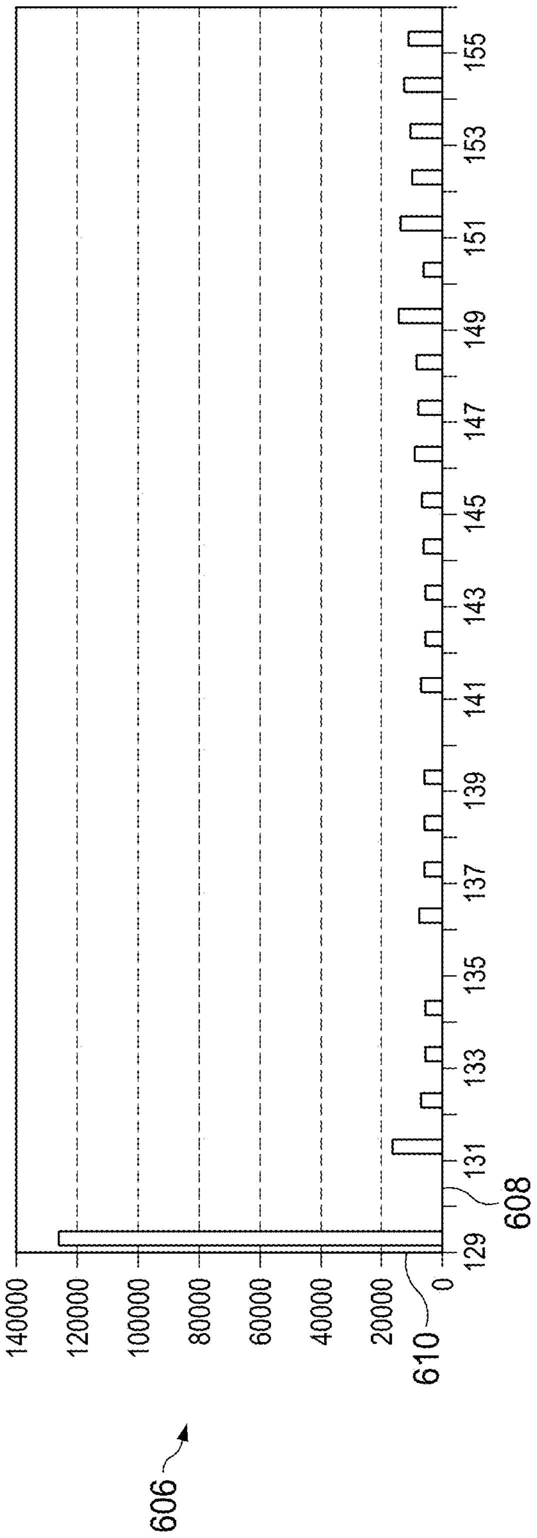

FIGS. 6A-6B depict an exemplary scenario illustrating a reduction in video jerkiness upon encoding of pictures corresponding to video data as explained with reference to system 200 of FIG. 2, in accordance with an embodiment. FIG. 6A illustrates a graph 600 depicting a reference index of pictures corresponding to a video data plotted along X-axis 602, and the corresponding number of bits consumed during encoding of the pictures plotted along Y-axis 604. FIG. 6A depicts an effect of a large value of maximum encoded picture size on subsequent pictures. It may be observed from FIG. 6A that a picture 129 consumes 127080 bits causing encoding of the eight subsequent pictures, for example pictures 130 to 137, to be skipped on account of exceeding an occupancy of a hypothetical buffer, causing severe video jerkiness when the encoded video data is subsequently decoded and displayed.

FIG. 6B illustrates a graph 606 depicting a reference index of pictures corresponding to the video data plotted along X-axis 608, and the corresponding number of bits consumed during encoding the pictures plotted along Y-axis 610, the pictures being encoded as explained with reference to system 200 of FIG. 2. More specifically, a determination of whether a picture is to be encoded may be performed for each picture as explained with reference to FIG. 2. It may be observed from FIG. 6B that subsequent to picture 129, encoding of only one picture, for example picture 130, is skipped, while the next four pictures (pictures 131-134) are encoded. It may be observed that the number and frequency of the pictures skipped during encoding is significantly reduced in the pictures of FIG. 6B when compared to the pictures of FIG. 6A indicating a reduction in video jerkiness for the pictures of FIG. 6B encoded as explained with reference to system 200 of the present technology. A method for encoding pictures associated with video data is explained with reference to FIG. 7.

Figure 7:
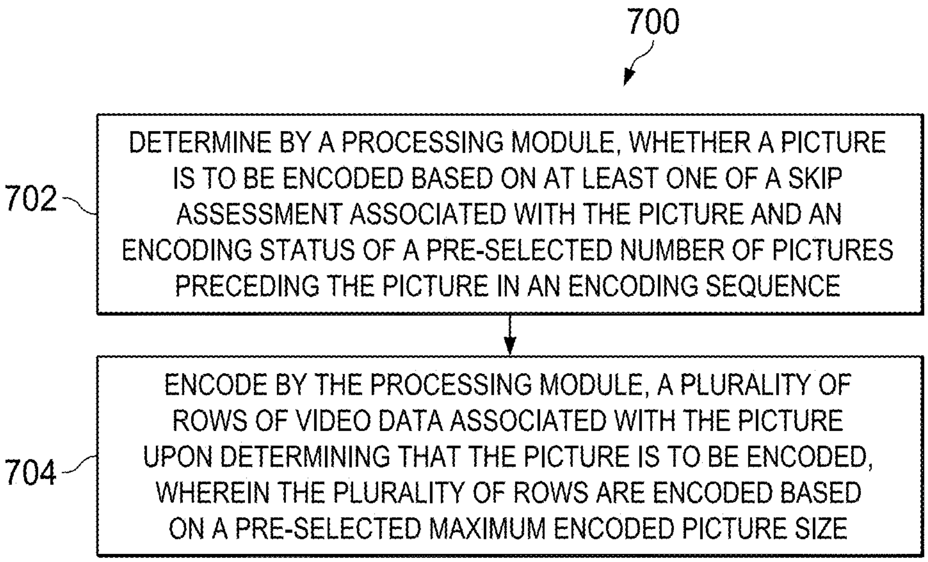
FIG. 7 is a flow diagram of a method for encoding pictures associated with video data, in accordance with an embodiment.

FIG. 7 is a flow diagram of a method 700 for encoding pictures associated with video data, in accordance with an embodiment. The method 700 depicted in flow diagram may be executed by, for example, the system 200 of FIG. 2. Operations of the flowchart, and combinations of operation in the flowchart, may be implemented by various means, such as hardware, firmware, processor, circuitry and/or other device associated with execution of software including one or more computer program instructions. The operations of the method 700 are described with help of the system 200. However, the operations of the method can be described and/or practiced by using any other system. The method 700 starts at operation 702.

At operation 702, it is determined by a processing module (for example, the processing module 202 of FIG. 2) whether a picture is to be encoded based on at least one of a skip assessment associated with the picture and an encoding status of a pre-selected number of pictures preceding the picture in an encoding sequence. In one embodiment, each picture in the encoding sequence corresponding to the video data may undergo determination of whether each picture is to be encoded or skipped from encoding.

In an embodiment, a video rate control (RC) mechanism may be configured to perform a skip assessment of each picture in the encoding sequence. In one embodiment, the skip assessment is determined based on a pre-defined skip threshold and an occupancy of a hypothetical buffer, such as the hypothetical buffer explained in FIG. 1, configured to store encoded pictures from among the pictures in the encoding sequence. As explained with reference to equation (1), a skip assessment for each picture is a function of the occupancy level of the hypothetical buffer at a time instant of encoding of the picture and the pre-defined skip threshold. In an embodiment, the pre-defined skip threshold corresponds to maximum allowable occupancy of the hypothetical buffer. In an embodiment, if the buffer_fullness is likely to be greater than or equal to the pre-defined skip threshold, then the skip assessment of the picture may be positive, implying the picture may be skipped from encoding. In an embodiment, if the buffer_fullness is not likely to be greater than or equal to the pre-defined skip threshold, then the skip assessment of the picture may be negative, implying the picture may be not be skipped from encoding (that is the picture is assessed to be encoded). The skip assessment associated with each video picture may be performed as explained with reference to FIG. 2.

In one embodiment, in addition to performing the skip assessment, an encoding status of a pre-selected number of pictures preceding the picture in an encoding sequence may be determined. In one embodiment, the encoding status may be indicative of whether the picture was encoded or skipped from encoding. In an embodiment, a set of pictures comprising the picture and the pre-selected number of pictures may be defined and a number of encoded pictures in the set of pictures may be determined as explained with reference to FIG. 3. In an embodiment, the current picture's encoding status may be accounted while determining the number of encoded pictures in the set of pictures. The determination of whether the current picture is to be encoded based on the number of encoded pictures in the set of pictures and the skip assessment associated with the current picture may be performed as explained with reference to FIG. 3. In an embodiment, a subsequent picture in the encoding sequence is selected for determination of whether to be encoded upon one of the encoding of the plurality of rows of video data associated with the picture and the determination of skipping of encoding of the picture.

At operation 704, a plurality of rows of video data associated with the picture may be encoded by the processing module (for example, the processing module 202 of FIG. 2) upon determining that the picture is to be encoded. In an embodiment, a plurality of rows may be encoded based on a pre-selected maximum encoded picture size. As explained with reference with FIG. 1, a limit may be placed on the maximum size of encoded pictures to preclude skipping of pictures on account of fullness of hypothetical buffer. In an embodiment, a number of bits associated with the pre-selected maximum encoded picture size is configured to be a value from among a plurality of values ranging from 15 times an average number of bits associated with encoded pictures in the encoding sequence to 45 times the average number of bits. For example, if the video data is captured at the rate of ‘F’ pictures per second and ‘R’ bits per second (bps), an average number of bits ‘T’ for each encoded video picture may be equal to R/F. In an embodiment, a value of the maximum encoded picture size may be selected to be a value from among the plurality of values ranging from 15*T to 45*T. In an embodiment, a choice of such a value may be used to mitigate the occurrence of video pulsing as illustrated with reference to FIGS. 5A-5C.

In an embodiment, during encoding the plurality of rows of video data, a number of bits consumed during encoding each row of video data from among the plurality of rows of video data may be tracked (for example, by using the processing module 202 of FIG. 2). As described with reference to FIG. 1 during encoding the video data with a pre-selected maximum encoded picture size, a row RC mechanism ensures that an encoded picture consumes less than the maximum encoded picture size. However, if the rows of video data are consuming more number of bits during encoding (for example, on account of complexity) and if a number of bits associated with the maximum encoded picture size is likely to be exceeded during encoding of the one or more remaining rows of video data, then a quantization scale is dynamically adjusted for encoding one or more remaining rows of video data from among the plurality of rows of video data. In an embodiment, the quantization scale is adjusted based on a weighted average of products of number of bits and quantization scales associated with one or more rows of video data previously encoded from among the plurality of rows of video data. In an embodiment, the weighted average may be implemented in such a manner that the immediately preceding rows to a row of video data currently being encoded may be assigned higher weightage. The higher weightage may be assigned as the immediately preceding rows may provide a better indication of the complexity of the row of video data currently being encoded than that of the encoded rows of video data farther away from the row of video data currently being encoded. In an embodiment, the weighted average is computed based on a triangular weighing function as explained with reference to FIG. 4. In an embodiment, the quantization scale may be dynamically adjusted based on equation (19). In an embodiment, the one or more remaining rows of video data may be encoded (for example, by the processing module 202 of FIG. 2) based on the adjusted quantization scale. In an embodiment, dynamically adjusting the quantization scale based on the weighted average value may mitigate occurrence of video quality degradation explained with reference to FIG. 1.

Figure 8A:
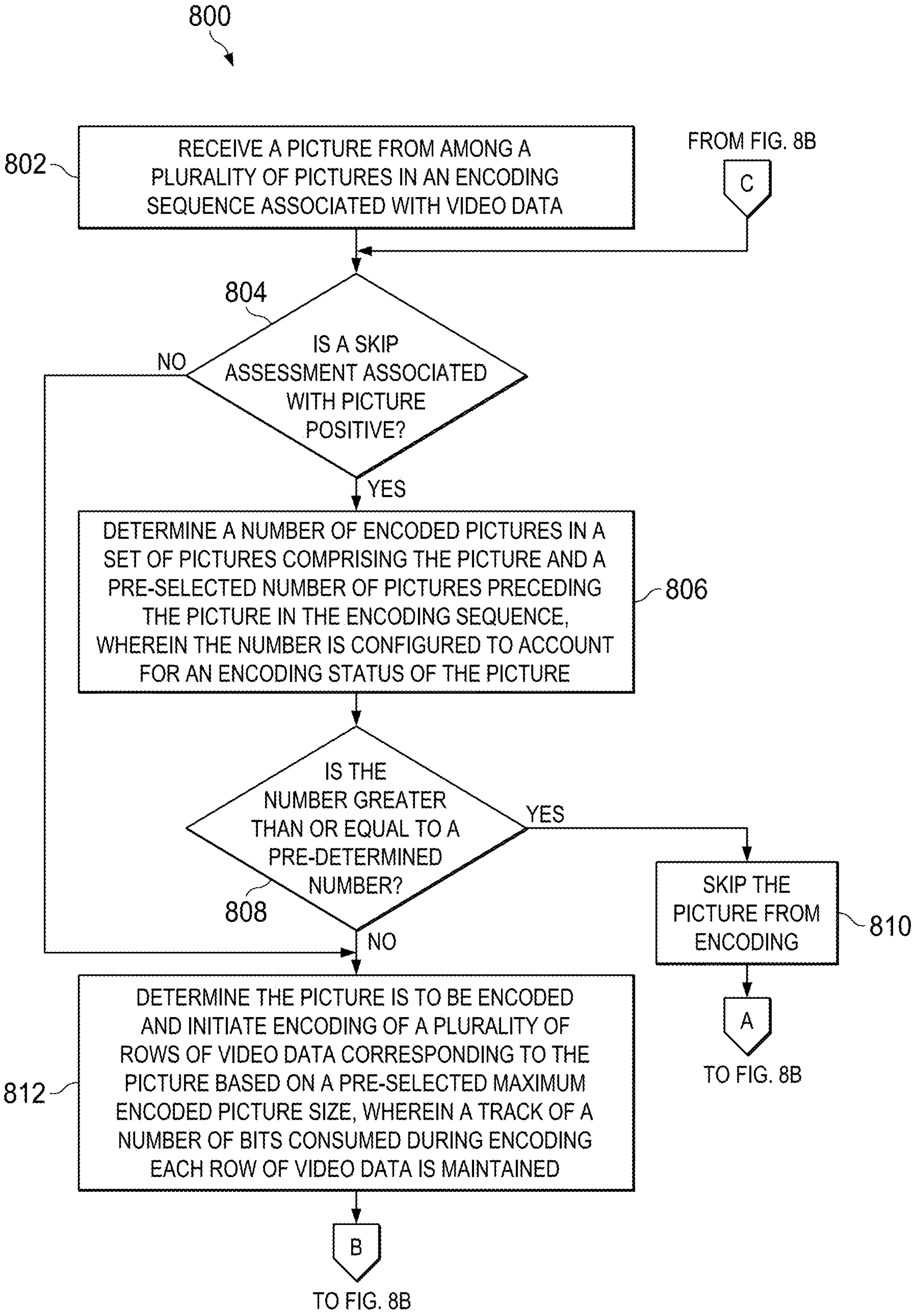
FIGS. 8A-8B collectively depict a flow diagram of a method for encoding pictures associated with video data, in accordance with another embodiment.
Figure 8B:
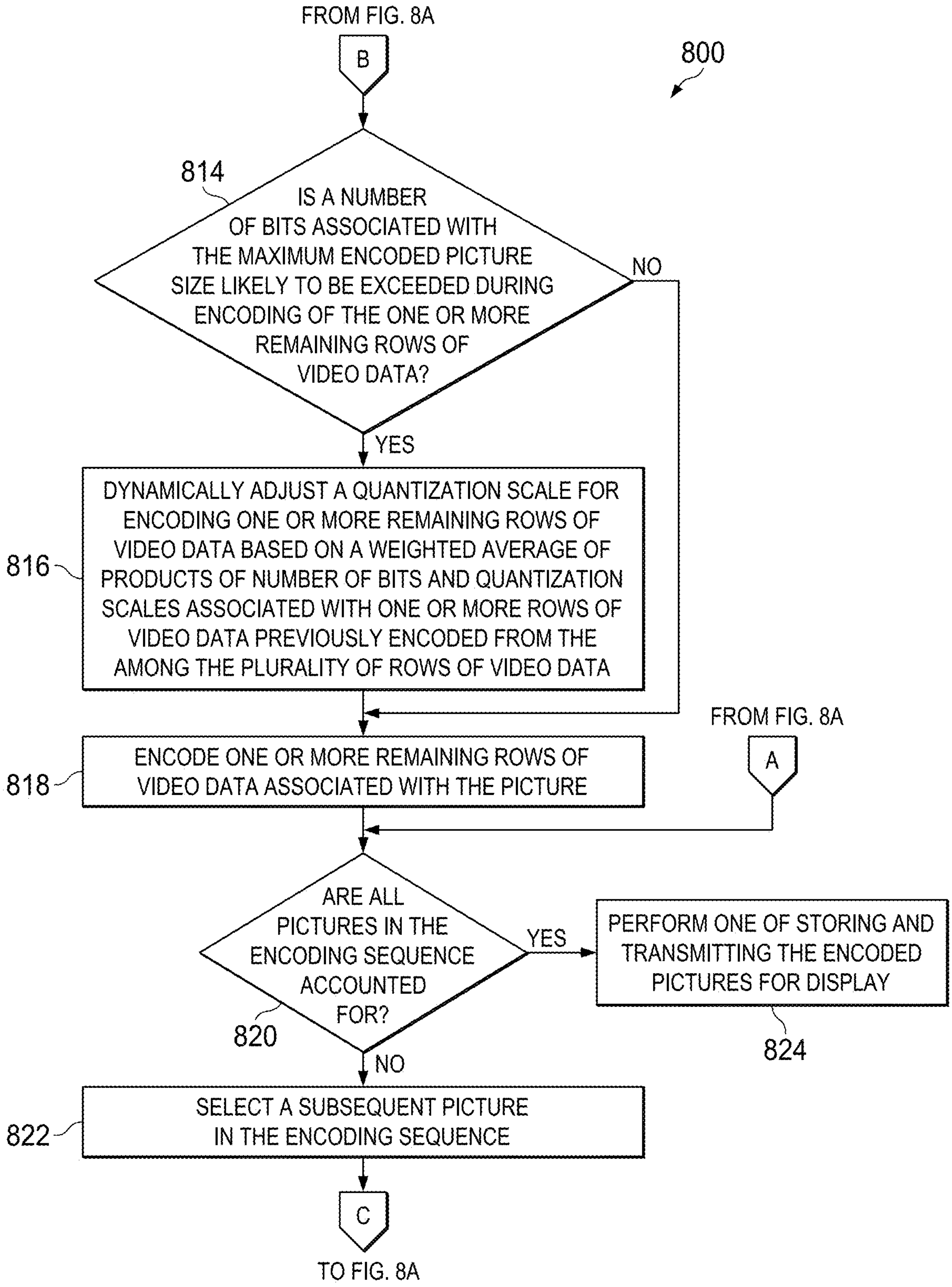

FIGS. 8A-8B collectively depict a flow diagram of a method 800 for encoding pictures associated with video data, in accordance with another embodiment. The method 800 depicted in flow diagram may be executed by, for example, the system 200 of FIG. 2. Operations of the flowchart, and combinations of operation in the flowchart, may be implemented by various means, such as hardware, firmware, processor, circuitry and/or other device associated with execution of software including one or more computer program instructions. The operations of the method 800 are described with help of the system 200. However, the operations of the method can be described and/or practiced by using any other system. The method 800 starts at operation 802.

At operation 802, a picture from among a plurality of pictures in an encoding sequence associated with video data is received. Examples of video data 102 may include, for example, image data, graphical data, textual data or any combination thereof. In an embodiment, the picture corresponding to the video data may be received from a media capture device, such as the media capture device explained with reference to FIG. 1. In an embodiment, the video data may be received from a plurality of remote media storage locations and/or memory location, such as memory module 204.

At operation 804, a skip assessment associated with the picture is determined (for example, by using the processing module 202 of FIG. 2) to be positive or not. A positive skip assessment implies that the picture may be skipped from encoding. A negative skip assessment implies that the picture may not be skipped from encoding. The skip assessment may be determined based on the pre-defined skip threshold and the occupancy of the hypothetical buffer as explained with reference to FIG. 2. On determining the skip assessment to be positive, operation 806 is performed. Alternatively, on determining the skip assessment to be negative, operation 812 is performed. At operation 806, a number of encoded pictures in a set of pictures comprising the picture and a pre-selected number of pictures preceding the picture in the encoding sequence is determined. The number of encoded pictures is configured to account for an encoding status of the picture. Choosing of the pre-selected number of pictures, defining the set of pictures and the determination of the number of encoded pictures in the set of pictures may be performed as explained with reference to FIG. 3.

At operation 808, the number is compared with a pre-determined number. As explained with reference to FIG. 2, the pre-determined number may be considered to correspond to a limit on a minimum number of encoded pictures required within each span of pictures in the encoding sequence to prevent the occurrence of video jerkiness, explained with reference to FIG. 1. If the number is greater than or equal to the pre-determined number then operation 810 is performed. If the number is less than the pre-determined number then operation 812 is performed.

At operation 810, it is determined that the picture may be skipped from encoding. At operation 812, it is determined that the picture is to be encoded and an encoding of a plurality of rows of video data corresponding to the picture may be initiated based on a pre-selected maximum encoded picture size. In an embodiment, a track of a number of bits consumed during encoding each row of video data is maintained. At operation 814, it is checked whether a number of bits associated with the maximum encoded picture size is likely to be exceeded during encoding of the one or more remaining rows of video data.

In an embodiment, the one or more rows may be encoded based on a pre-selected maximum encoded picture size. In an embodiment, a number of bits associated with the pre-selected maximum encoded picture size is configured to be a value from among a plurality of values ranging from 15 times an average number of bits associated with encoded pictures in the encoding sequence to 45 times the average number of bits. In an embodiment, selecting a value of the maximum encoded picture size from among the plurality of values ranging from 15*T to 45*T, where T corresponds to the average number of bits associated with the encoded pictures. In an embodiment, a choice of such a value may be used to mitigate the occurrence of video pulsing explained with reference to FIGS. 5A-5C.

If it is determined that the number of bits associated with the maximum encoded picture size is likely to be exceeded during encoding the one or more remaining rows of video data, then operation 816 is performed. At 816, a quantization scale is dynamically adjusted for encoding one or more remaining rows of video data based on a weighted average of products of number of bits and quantization scales associated with one or more rows of video data previously encoded from the among the plurality of rows of video data. The adjusting of the quantization scale may be performed as explained with reference to FIG. 4. In an embodiment, the quantization scale may be adjusted based on equation (19).

At operation 818, the one or more remaining rows of video data are encoded based on adjusted/un-adjusted quantization scales. At operation 820, it is checked whether all pictures in the encoding sequence are accounted for, i.e. either one of encoded or skipped from encoding. If it is determined that all pictures are not accounted for, then operation 822 is performed. If it is determined that all the pictures are accounted for, then operation 824 is performed. At operation 822, a subsequent picture in the encoding sequence is selected and operations 804-820 are repeated till all the pictures in the encoding sequence are accounted for. If at operation 810, the picture is determined to be skipped from encoding, then the subsequent picture in the encoding sequence may be selected at 822 and operations 804-820 are repeated till all the pictures in the encoding sequence are accounted for. At operation 824, the encoded pictures are one of stored or transmitted for display. The method 800 ends at 824.

Figure 9:
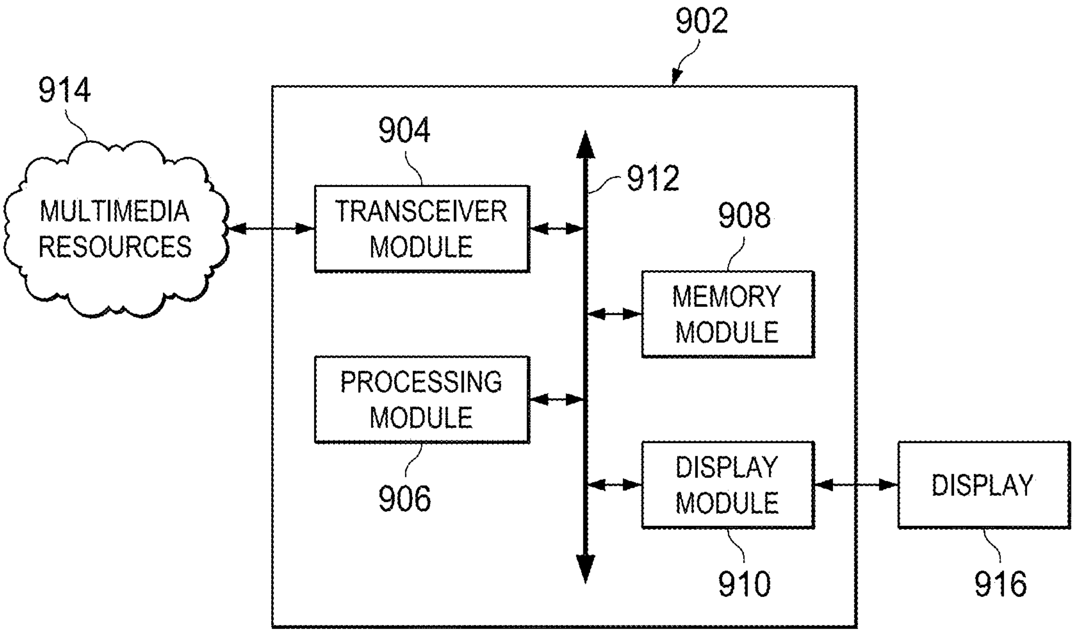
FIG. 9 is a block diagram of an integrated circuit for encoding pictures associated with video data, in accordance with an embodiment.

FIG. 9 is a block diagram of an integrated circuit 902 for encoding pictures associated with video data, in accordance with an embodiment. In an embodiment, the system 200 of FIG. 2 may be embodied at least partially in form of the integrated circuit 902. The integrated circuit 902 comprises a transceiver module 904, a processing module 906, a memory module 908 and a display module 910. The transceiver module 904, the processing module 906, the memory module 908 and the display module 910 are communicatively associated or coupled with each other using data path 912. As such, it should be appreciated that at least some of the components described below in connection with the integrated circuit 902 may be optional and thus in an example embodiment the integrated circuit 902 may include more, less or different components than those described in connection with the example embodiment of FIG. 9. In an embodiment, the integrated circuit 902 may include only the processing module 906 and the memory module 908.

The transceiver module 904 is communicatively associated or coupled with a plurality of multimedia resources 914 and is configured to receive pictures associated with video data from one or more multimedia resources from among the plurality of multimedia resources 914. Examples of the multimedia resources may include, but are not limited to (1) remote multimedia systems (2) media capture devices, such as, for example, a camera, camcorders and the like, and (3) multimedia storage devices, such as, for example, magnetic tapes, disks, computer-readable media and the like. In an embodiment, the transceiver module 904 may include an antenna and/or network connectors configured to coupled with or connect to wired networks (for example, local area networks (LANs)) and wireless networks (for example, cellular networks), or a combination thereof (for example, the Internet). Examples of network connectors may include a universal serial bus (USB) interface, a wireless LAN interface, an infrared interface, an Ethernet port and the like.

The processing module 906 is configured to perform encoding of pictures associated with the video data. In an embodiment, the processing module 906 may be configured to encode the video data and provide the video data to transceiver module 904 for transmission purposes or to memory module 908 for storage purposes. In an embodiment, the processing module 906 may be substantially similar to processing module 202 of system 200 of FIG. 2. The processing module 906 is configured to perform functions as discussed in FIG. 2, which are not repeated herein for the sake of brevity.

The memory module 908 is configured to store the video data subsequent to encoding of the video data. In an embodiment, the memory module 908 may be substantially similar to the memory module 204 of system 200 of FIG. 2. The memory module 908 is configured to perform functions as discussed in FIG. 2, which are not repeated herein for the sake of brevity. Examples of memory module 908 may include, but are not limited to, RAM, dual port RAM, SDRAM, DDR SDRAM, and the like. The display module 910 is configured to facilitate a display of the video data on display 916. The display 916 may be facilitated, for example, in response to a user input received using a user interface (not shown in FIG. 9). Examples of display 916 may include a light crystal display (LCD) panel, a plasma display panel, a field emission display and the like.

In an embodiment the integrated circuit 902 may be an application processor chip. In an embodiment, the integrated circuit 902 may be a part of a particular or shared processor chip that is embedded within a multimedia system. Examples of the multimedia system may include, but are not limited to, (1) multimedia devices, such as, for example, cellular phones, digital video cameras and digital camcorders; (2) data processing devices, such as, for example, personal computers, laptops and personal digital assistants; and (3) consumer electronics, such as, for example, set top boxes, digital video disk (DVD) players and video network servers.

Without in any way limiting the scope, interpretation, or application of the claims appearing below, advantages of one or more of the exemplary embodiments disclosed herein include allowing utilization of a large maximum encoded picture size (for example, of the order of 15*T to 45*T) for encoding pictures associated with the video data thereby enabling better quality of encoding of I-pictures and precluding occurrence of quality degrading issues, such as video pulsing. Further, the present technology suggests techniques for avoiding consecutive picture skips during encoding thereby precluding the occurrence of video jerkiness. Furthermore, the problems of video pulsing and video jerkiness are jointly addressed though they entail contradictory requirements thereby ensuring an optimal trade-off between video pulsing and video jerkiness. Further, performing row rate control based on weighted average of previously encoded rows improves picture quality significantly and precludes degradation observed near select portions within the picture.

Although the present technology has been described with reference to specific exemplary embodiments, it is noted that various modifications and changes may be made to these embodiments without departing from the broad spirit and scope of the present technology. For example, the various devices, modules, analyzers, generators, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the various electrical structures and methods may be embodied using transistors, logic gates, and electrical circuits (for example, application specific integrated circuit (ASIC) circuitry and/or in Digital Signal Processor (DSP) circuitry).

Particularly, the system 200, the processing module 202 and the memory module 204 may be enabled using software and/or using transistors, logic gates, and electrical circuits (for example, integrated circuit circuitry such as ASIC circuitry). Various embodiments of the present disclosure may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. Additionally, a tangible data storage device may be embodied as one or more volatile memory devices, one or more non-volatile memory devices, and/or a combination of one or more volatile memory devices and non-volatile memory devices.

Also, techniques, devices, subsystems and methods described and illustrated in the various embodiments as discrete or separate may be combined or integrated with other systems, modules, techniques, or methods without departing from the scope of the present technology. Other items shown or discussed as directly coupled or communicating with each other may be coupled through some interface or device, such that the items may no longer be considered directly coupled with each other but may still be indirectly coupled and in communication, whether electrically, mechanically, or otherwise, with one another. Other examples of changes, substitutions, and alterations ascertainable by one skilled in the art, upon or subsequent to studying the exemplary embodiments disclosed herein, may be made without departing from the spirit and scope of the present technology.

It should be noted that reference throughout this specification to features, advantages, or similar language does not imply that all of the features and advantages should be or are in any single embodiment. Rather, language referring to the features and advantages may be understood to mean that a specific feature, advantage, or characteristic described in connection with an embodiment may be included in at least one embodiment of the present technology. Thus, discussions of the features and advantages, and similar language, throughout this specification may, but do not necessarily, refer to the same embodiment.

Various embodiments of the present disclosure, as discussed above, may be practiced with steps and/or operations in a different order, and/or with hardware elements in configurations which are different than those which are disclosed. Therefore, although the technology has been described based upon these exemplary embodiments, it is noted that certain modifications, variations, and alternative constructions may be apparent and well within the spirit and scope of the technology. Although various exemplary embodiments of the present technology are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A method comprising:

selecting a quantization value for a current region in a picture by at least performing a weighting operation using:

a first number of encoded bits for a neighboring region in the picture, wherein the neighboring region is adjacent to the current region; and a second number of encoded bits for a top region in the picture, wherein the top region is adjacent to a top edge of the picture, and wherein the first number of encoded bits is weighted more heavily than the second number of encoded bits in the weighting operation; and encoding data for the current region using the quantization value.

2. The method of claim 1, wherein the current region is a current row in the picture.

3. The method of claim 2, wherein the neighboring region is a neighbor row that is adjacent to the current row.

4. The method of claim 2, wherein the top region is a top row in the picture that is adjacent to the top edge of the picture.

5. The method of claim 1, wherein the quantization value is a quantization scale value used to encode the data for the current region.

6. The method of claim 1, wherein performing the weighting operation includes:

determining a first weight for the first number of encoded bits using a position of the neighboring region in the picture and a position of the current region in the picture; and determining a second weight for the second number of encoded bits using a position of the top region in the picture and the position of the current region in the picture.

7. The method of claim 6, wherein the first and second weights are determined using a triangular weighting function.

8. The method of claim 1, wherein selecting the quantization value for the current region includes performing the weighting operation using:

a first quantization scale used to encode the neighboring region; and a second quantization scale used to encode the top region.

9. A system comprising:

a camera configured to generate a picture; and a processing circuit coupled to the camera and configured to:

select a quantization value for a current region in the picture by at least performing a weighting operation using:

a first number of encoded bits for a neighboring region in the picture, wherein the neighboring region is adjacent to the current region; and a second number of encoded bits for a top region in the picture, wherein the top region is adjacent to a top edge of the picture, and wherein the first number of encoded bits is weighted more heavily than the second number of encoded bits in the weighting operation; and encode data for the current region using the quantization value.

10. The system of claim 9, wherein the current region is a current row in the picture.

11. The system of claim 10, wherein the neighboring region is a neighbor row that is adjacent to the current row.

12. The system of claim 10, wherein the top region is a top row in the picture that is adjacent to the top edge of the picture.

13. The system of claim 9, wherein the quantization value is a quantization scale value used to encode the data for the current region.

14. The system of claim 9, wherein to perform the weighting operation, the processing circuit is configured to:

determine a first weight for the first number of encoded bits using a position of the neighboring region in the picture and a position of the current region in the picture; and determine a second weight for the second number of encoded bits using a position of the top region in the picture and the position of the current region in the picture.

15. The system of claim 14, wherein the processing circuit is configured to determine the first weight and the second weight using a triangular weighting function.

16. The system of claim 9, wherein to select the quantization value for the current region, the processing circuit is configured to perform the weighting operation using:

a first quantization scale used to encode the neighboring region; and a second quantization scale used to encode the top region.

17. A non-transitory computer-readable medium having executable instructions stored thereon, configured to be executable by a processing circuit for causing the processing circuit to:

select a quantization value for a current region in a picture by at least performing a weighting operation using:

a first number of encoded bits for a neighboring region in the picture, wherein the neighboring region is adjacent to the current region; and a second number of encoded bits for a top region in the picture, wherein the top region is adjacent to a top edge of the picture, and wherein the first number of encoded bits is weighted more heavily than the second number of encoded bits in the weighting operation; and encode data for the current region using the quantization value.

18. The non-transitory computer-readable medium of claim 17, wherein the current region is a current row in the picture.

19. The non-transitory computer-readable medium of claim 18, wherein the neighboring region is a neighbor row that is adjacent to the current row, and wherein the top region is a top row in the picture that is adjacent to the top edge of the picture.

20. The non-transitory computer-readable medium of claim 17, wherein the instructions to select the quantization value for the current region include instructions to perform the weighting operation using:

a first quantization scale used to encode the neighboring region; and a second quantization scale used to encode the top region.

* * * * *